United States Patent [19]

Edwards

[11] Patent Number: 5,653,096
[45] Date of Patent: Aug. 5, 1997

[54] MANEUVERABLE THREE-WHEELED LAWN MOWER

[76] Inventor: Byford E. Edwards, 501 E. Meridian, Marion, Ill. 62959

[21] Appl. No.: 523,391

[22] Filed: Sep. 5, 1995

[51] Int. Cl.$^6$ .............................. A01D 34/67; A01D 34/86
[52] U.S. Cl. .................. 56/16.7; 16/111 A; 56/DIG. 18
[58] Field of Search ...................... 56/16.7, 17.5, 56/DIG. 18; 16/111 A

[56] References Cited

U.S. PATENT DOCUMENTS

| | | | |
|---|---|---|---|
| 3,382,653 | 5/1968 | Buigne | 56/12.9 |
| 3,465,505 | 9/1969 | Krinke | 56/320.1 |
| 3,702,016 | 11/1972 | Keesee | 16/111 A |
| 4,688,376 | 8/1987 | Wolfe, Sr. | 56/16.7 |
| 4,942,726 | 7/1990 | Bowditch | 56/17.2 |
| 5,090,185 | 2/1992 | Meeks | 56/16.7 |

Primary Examiner—David J. Bagnell

[57] ABSTRACT

A lightweight mower mounted on three caster wheels, having locking pins by which the two front casters may be locked in a straight line position, parallel to the handle, rendering the unit a conventional straight line mower, an extendable handle which will also rotate to the front of the mower, by means of a specially designed handle bracket, which will, when combined with the free wheeling rotation of the caster wheels in the unlocked position, create a free wheeling mower which will move in the direction of applied force, with additional reach which will allow the operator to mow downhill from himself, while pulling the mower in a lateral pattern.

1 Claim, 4 Drawing Sheets

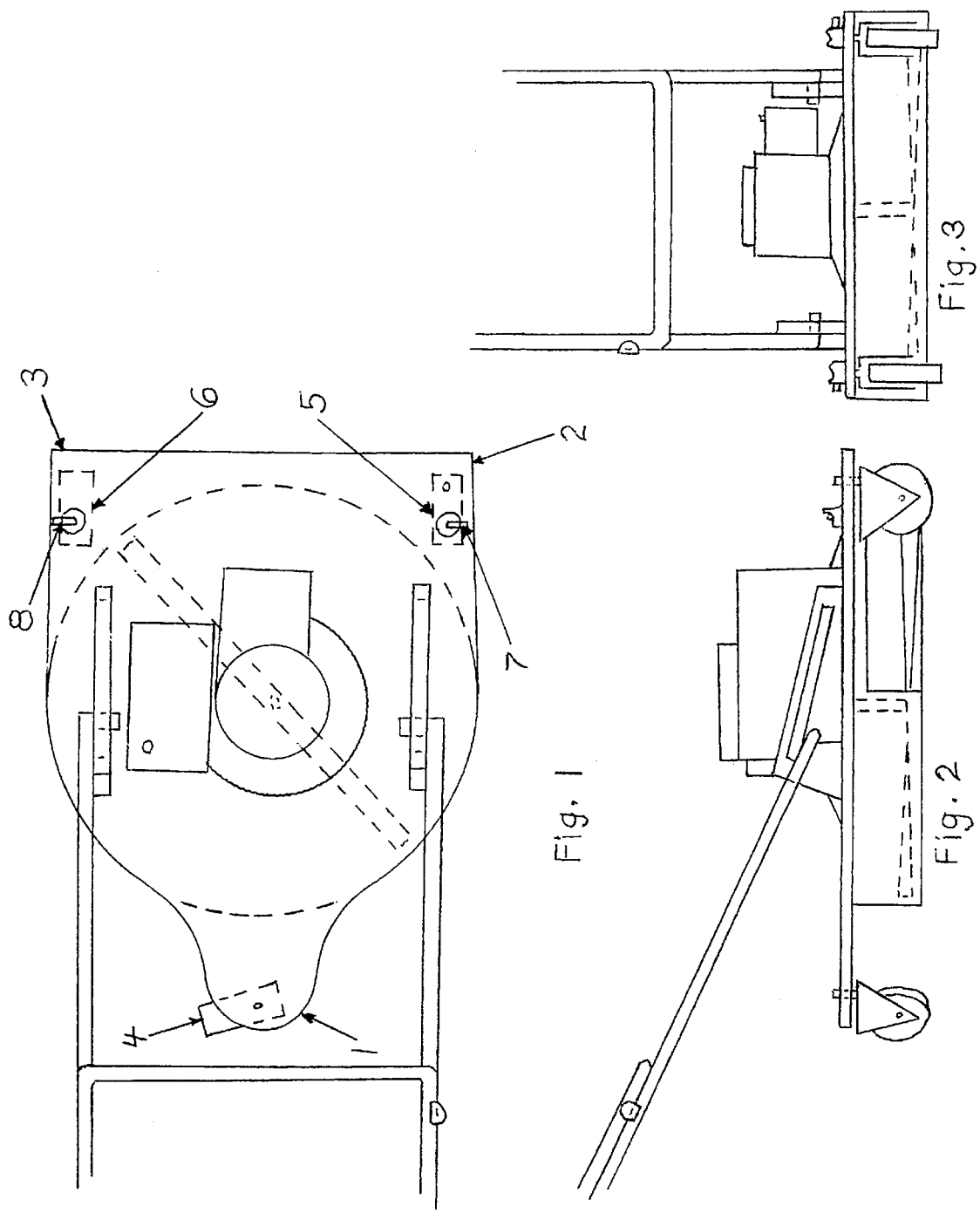

MANEUVERABLE THREE-WHEELED LAWN MOWER

BACKGROUND OF THE INVENTION

This new device relates to the field of lawn mowing and grass trimming. More particularly, it relates to the field involving electric or gasoline powered cutting devices utilizing a rotary blade.

Electric and gasoline driven powered mowers are well known in the art throughout the United States. The basic structure of the lawn mower consists of a frame which has a handle attached to the top, which extends to the rear of the mower and wheels attached in a fixed straight line position to the sides of the frame. On top of the frame is an electric or gasoline powered engine that turns a shaft which in turn rotates a lawn mower blade lying beneath the upper surface of the main frame of the mower.

It has been known in the art to allow the wheels to be simultaneously lowered, thus raising the distance between the top of the grass and the cutting blade of the mower.

Krinke, U.S. Pat. No. 3,465,505 has added a feature which allows the wheels to slant from their normal perpendicular position with respect to the ground. These wheels are capable of forming an oblique angle with the ground, thus making it easier to use the mower when cutting on an incline or hill.

Pushing a lawn mower on the side of a hill is difficult and often dangerous even when the wheels can be adjusted to an oblique angle.

Bowditch, U.S. Pat. No. 4,942,726 invented a conversion kit to replace the front, straight line wheels of a lawn mower with casters.

Buigne, U.S. Pat. No. 3,382,653 combined straight line wheels with a caster and even though his invention has steerable wheels, neither inventor has overcome the limitation of the conventional straight line movement to offer unlimited and free wheeling movement within 360°. The instant invention does.

Keesee, U.S. Pat. No. 3,702,016 invented an extendable and rotatable mower handle for the express purpose of providing a compact unit to reduce storage space. The instant invention incorporates an extendable and rotatable handle with other features to create an operational unit.

The difficulty and danger of maneuvering a lawn mower on the side of a hill are eliminated by the instant invention, while maintaining as one of two modes, a straight line mower.

It is the object of this invention to provide a lawn mower with two distinct modes, that of a conventional straight line mower and a highly maneuverable free wheeling mower which can be pulled or pushed in any direction within 360°. The transfer from one mode to the other maybe performed in a couple of minutes.

BRIEF DESCRIPTION OF THE INVENTION

A unique lawn mower is presented utilizing a combination of caster wheels, locking pins and an extendable and rotatable handle, with interacting principles, for the purpose of providing straight line mowing and mowing at any angle the operator may choose.

BRIEF DESCRIPTION OF THE DRAWINGS

FIG. 1 is a top view of the mower.
FIG. 2 is a side view of the mower.
FIG. 3 is a front view of the mower.

DETAILED DESCRIPTION OF THE PREFERRED EMBODIMENT

The mower which is the subject of this invention has a circular body which has three protrusions as best shown on FIG. 1. The rear protrusion, 1, is placed centrally in the mower body as shown. The two front protrusions of the body, 2 and 3, are placed as shown on FIG. 1.

Each of the three protrusions have a female caster support fastened to the lower side. A rear caster wheel assembly, 4, is inserted into the female caster wheel support. This rear caster wheel and assembly allows the rear wheel to freely rotate about the vertical axis of the caster wheel stem. Caster wheel assemblies are also attached to the front protrusions, 2 and 3, as best shown on FIG. 1. These front caster wheels are also able to rotate about the vertical axis of the caster wheel stem. However, these front caster wheels, 5 and 6, have an added feature which is not present in the rear caster wheel, 4.

The front caster wheels, 5 and 6, are capable of being locked into position by front caster wheel locking pins, 7 and 8. These pins, as best shown on FIG. 1, are capable of locking the caster wheels parallel to each other and facing so that the direction of roll is parallel to the mower handle.

Figure 4:
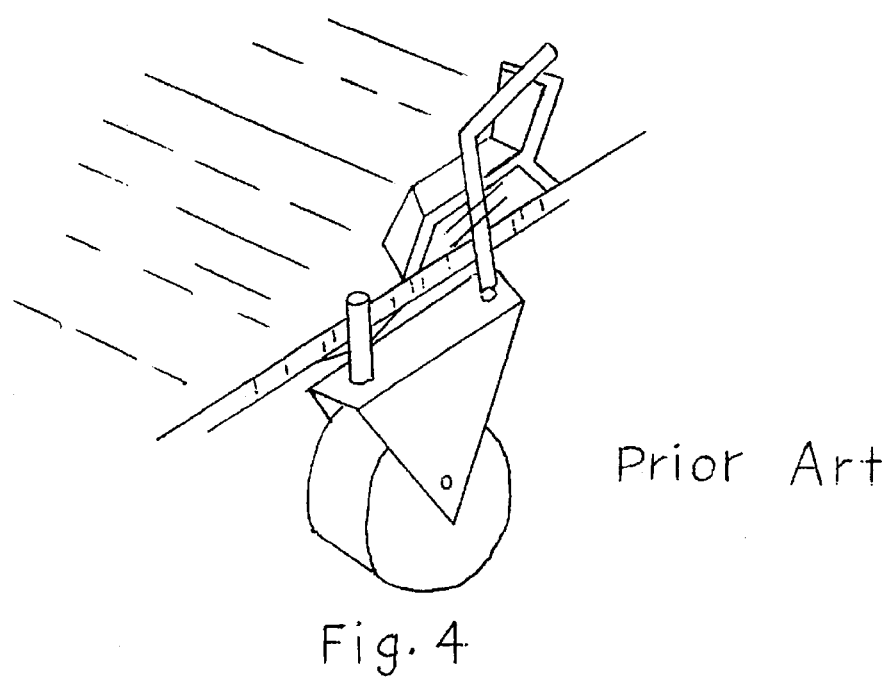
FIG. 4 is a typical hand operated locking pin and a caster wheel assembly.
Figure 5:
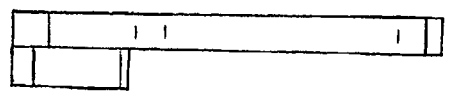
FIG. 5 is a top view of the handle bracket.

Locking pins and their assembly are well known in the art. FIG. 4 identifies a simple hand operated locking pin which will insert into the caster wheel frame for the purpose of locking and unlocking the caster.

Figure 8:
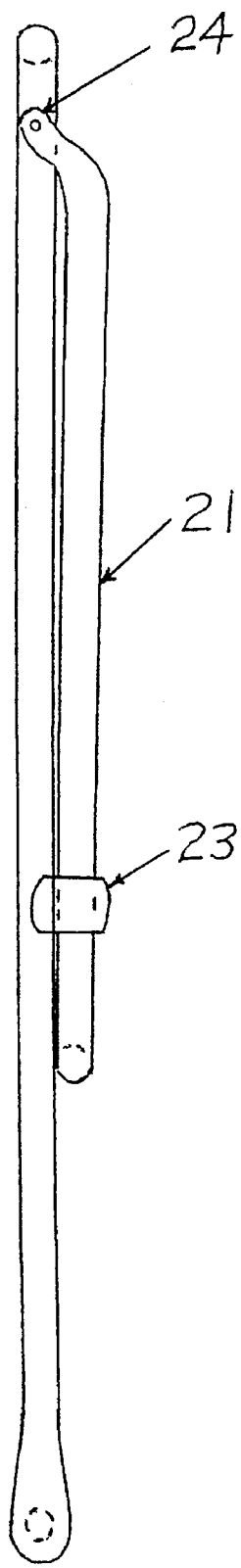
FIG. 8 is a side view of the handle.
Figure 9:
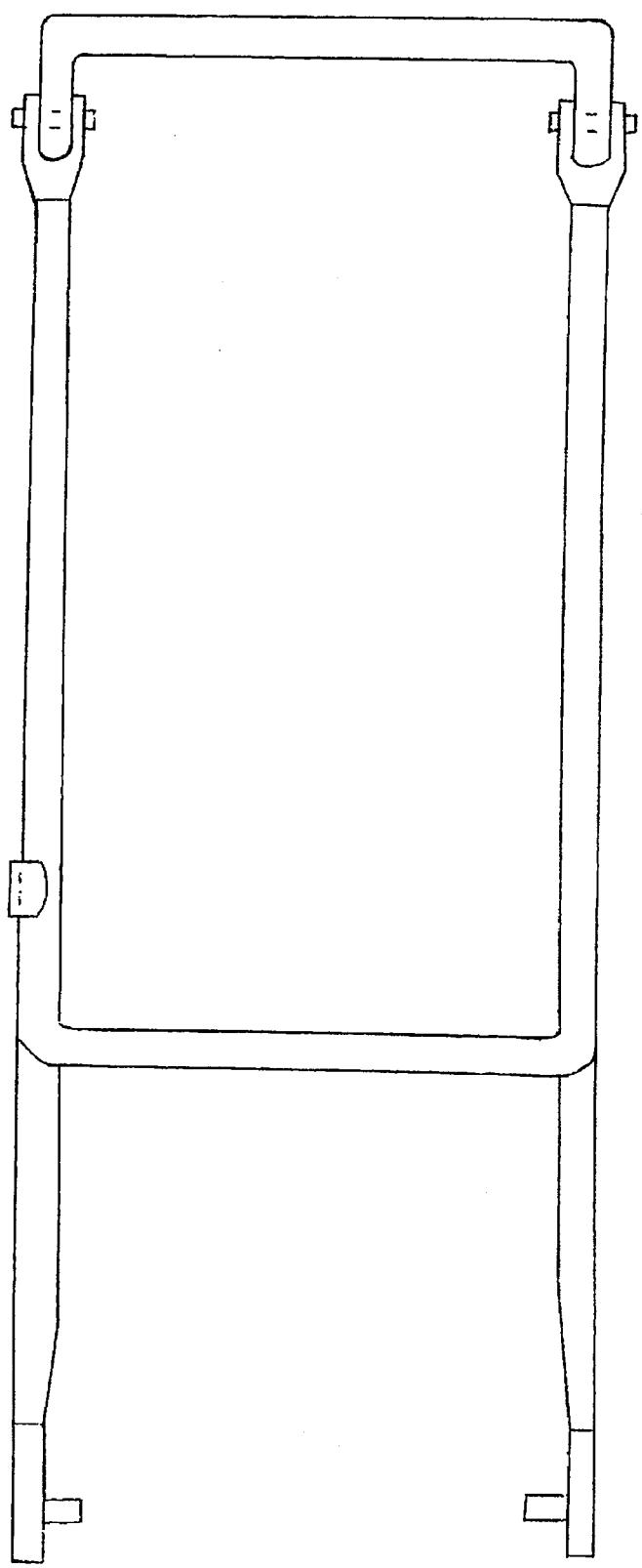
FIG. 9 is a top view of the handle.

The mower handle is constructed so that it is easily extendable as best shown on FIG. 8. The mower handle is extendable by rotating handle, 21, about the extension handle hinge, 24. When the handle is folded, it is held in position by standard clamp 23β.

The handle brackets are designed to allow the handle to interact with the casters and the locking pins. The features of the brackets are best shown on FIG. 6. Positions A and B are at either end of horizonal J slide, 14, cut in the handle brackets. Position A is the position for the handle when the straight line mode is needed, and B is for the free wheeling mode. Item 11 is a rest for the handle when in position A and will hold the folded handle at an oblique angle to the base of the mower for the operator's use in straight line mowing.

Figure 6:
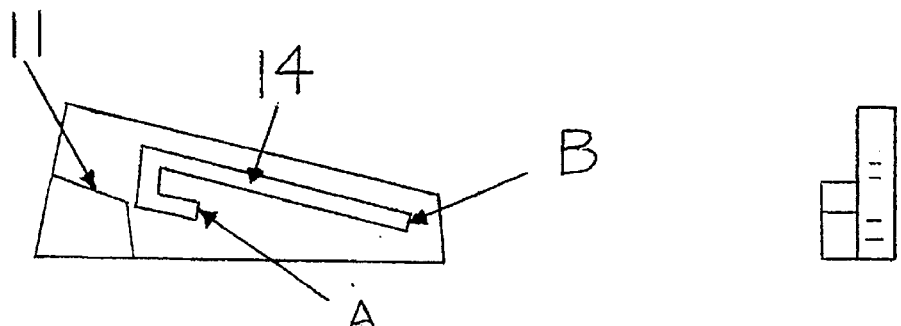
FIG. 6 is a side view of the handle bracket.
Figure 7:
FIG. 7 is a front view of handle bracket.

In conjunction with casters 5 and 6, FIG. 1, in the locked position and extension handle 21, FIG. 8, folded at hinge 24, FIG. 8, and held by standard clamp 23, FIG. 8, and also positioned at A, FIG. 6, and laying on rest 11, FIG. 6, the mower is different from a conventional straight line mower only in respect to the rear caster 4, FIG. 1. Rear caster 4 has no locking pin and is always free to rotate and will follow and track as the operator initiates a turn, eliminating the need to lift, tilt, or otherwise manhandle the mower. FIG. 1 shows the mower in the straight line mode.

Figure 10:
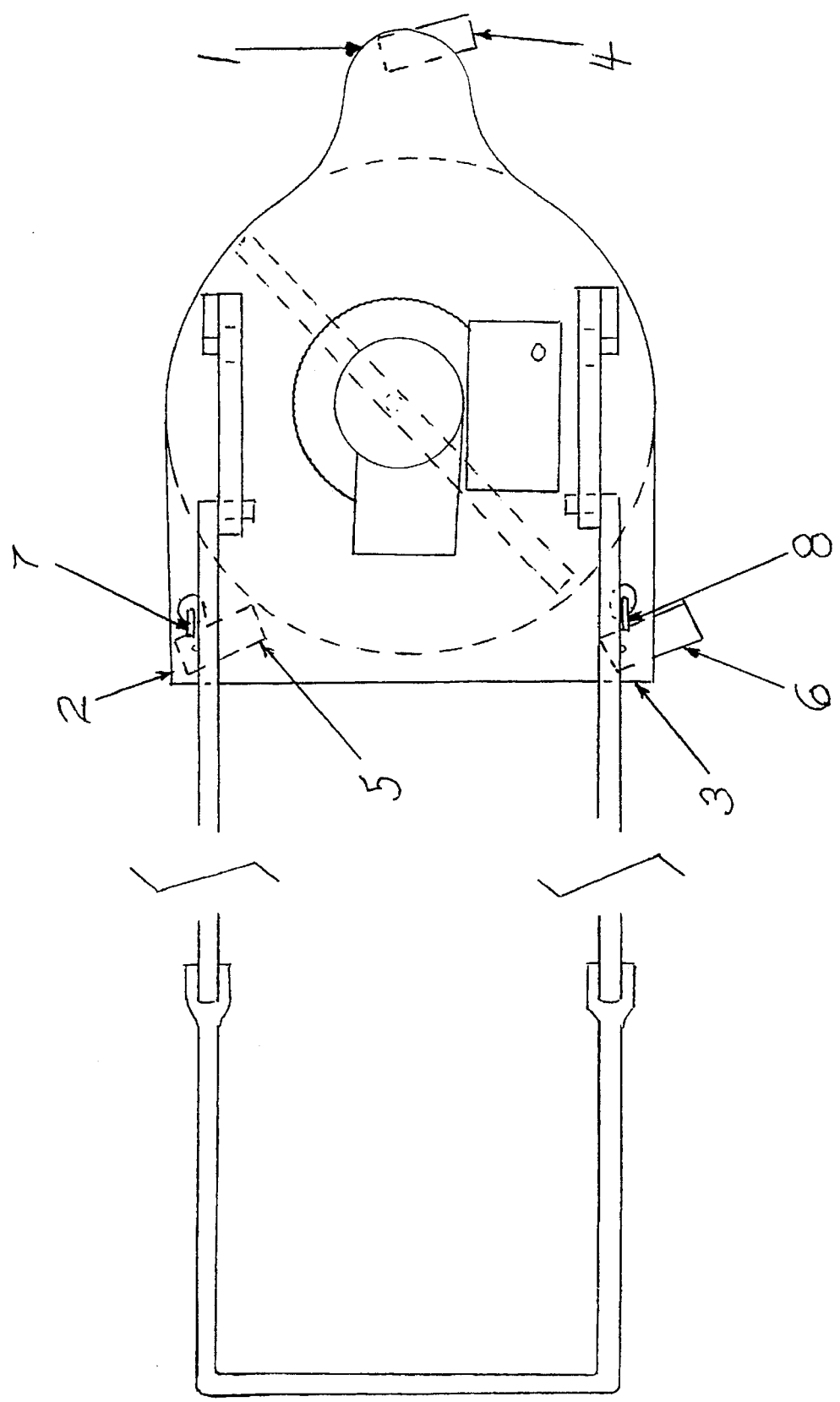
FIG. 10 is a top view of the mower.

In conjunction with casters 5 and 6, FIG. 1, in the unlocked position and the handle released at standard clamp 23, FIG. 8, and extended at hinge 24, FIG. 8, and the handle also repositioned at B, FIG. 6, by means of the horizonal J slide and rotated forward as shown on FIG. 10, the mower is in the free wheeling mode.

It is this free wheeling mode that the mower maybe easily used to cut grass on a hillside or incline, while operator is positioned uphill from the mower and pulling the mower in a lateral pattern across the hill.

In operation it can be seen that the above described lawn mower is highly maneuverable and versatile in its use. The mower maybe pushed or pulled sideways, in a circular motion or pulled across the side of a hill, or converted into a conventional straight line mower.

I claim:

1. A lawn mower comprising: A circular base, two front protrusions positioned so as to form boxlike corners, one protrusion located center of said two front protrusions and to the rear of said circular base, caster wheel supports mounted to the underside of said protrusions, caster wheels inserted into said caster wheel supports, locking pins mounted on the surface of said circular base and positioned so as to lock said two front caster wheels into a parallel to the handle position and unlock same, a handle bracket mounted on the surface of said circular base having two positions to accommodate a rotation of the handle from the back end of said mower to the front end, an extension handle hinge to accommodate said handle to extend.

\* \* \* \* \*